United States Patent [19]

Stock

[11] 3,907,308

[45] Sept. 23, 1975

[54] BELL SEAL VIBRATION DAMPER AND SEAL IMPROVEMENT

[75] Inventor: Alvin L. Stock, Wallingford, Pa.

[73] Assignee: Westinghouse Electric Corporation, Pittsburgh, Pa.

[22] Filed: Sept. 27, 1973

[21] Appl. No.: 401,522

[52] U.S. Cl............ 277/72 R; 277/DIG. 8; 415/138
[51] Int. Cl............................................. F16j 15/40
[58] Field of Search......... 277/70, 72 R, DIG. 8, 71; 415/138, 139, 219 R

[56] References Cited
UNITED STATES PATENTS 2,527,446  10/1950  Jenks, Jr. et al................... 415/139
2,890,069  6/1959   Larkin et al........................ 277/94

Primary Examiner—Samuel B. Rothberg
Attorney, Agent, or Firm—G. M. Medwick

[57] ABSTRACT

A seal ring for a bell seal device in an axial flow elastic fluid turbine apparatus. The seal ring is a split annular ring fabricated of an elastic material and disposed in a circumferential groove about the radially outer surface of the bell seal device. The seal ring provides close contact between the radially outer surface of the bell seal device and an inner surface of an inner cylinder of the turbine apparatus. Disposition of the seal ring eliminates leakage flow through a narrow channel between the radially outward surface of the bell seal device and the inner surface of the inner cylinder. In addition, the contact interfaces between the seal ring and the bell seal device and between the seal ring and the inner cylinder provide a damper for absorbing vibrational energies generated within the bell seal device.

5 Claims, 3 Drawing Figures

BELL SEAL VIBRATION DAMPER AND SEAL IMPROVEMENT

BACKGROUND OF THE INVENTION

1. Field of the Invention

This invention relates to turbine seals, and in particular, to a split elastic seal ring for use with a bell seal device.

2. Description of the Prior Art

In an axial flow elastic fluid turbine apparatus having a concentric inner and outer cylinder casing arrangement, provision must be made to adequately seal any conduits which pass through both cylinders to communicate with the turbine interior. This is especially true in the case of a main inlet conduit which conducts the motive fluid, usually steam, into a nozzle chamber on the interior of the turbine apparatus. From the nozzle chamber the motive fluid expands through the stationary and rotating elements of the turbine apparatus.

In some turbines, a portion of the main inlet conduit is integral with the outer cylinder, while the nozzle chamber is integral with the inner cylinder. Since differential thermal expansion of the inner and outer cylinders relative to each other precludes the possibility of direct attachment between the main inlet conduit and the nozzle chamber, provision must be made to seal the main inlet conduit which is integral with the outer cylinder against the nozzle chamber which is integral with the inner cylinder to provide for an efficient motive fluid flow.

The first attempt at provision of a suitable sealing device utilized annular pressure seal rings, similar to piston rings, between adjacent surfaces of the inlet conduit integral with the outer cylinder and the nozzle chamber integral with the inner cylinder. However, these pressure seal rings allowed excessive steam flow to pass between them, and, for this reason, proved disadvantageous.

To replace the pressure seal ring, the bell seal device is utilized in the prior art. The bell seal device is disposed between the main inlet conduit integral with the outer cylinder and the nozzle chamber integral with the inner cylinder. The bell seal device takes its name from its distinctive bell shape. The crown portion of the bell seal device has a central opening extending therethrough which receives the main inlet conduit. The radially-outward flaring lip portion of the bell seal device extends to contact the inner surface of the nozzle chamber. In this way, an effective seal arrangement between the main inlet conduit integral with the outer cylinder and the nozzle chamber integral with the inner cylinder is effected.

In principle, the bell seal device is free to slide in any transverse direction against the main inlet conduit. The bell seal device is also free to slide vertically or circumferentially at the seal interface between the lip portion of the bell seal and the nozzle chamber.

In order to assemble the turbine cylinders, the bell seal must have a predetermined small initial clearance on the order of a few thousands of an inch as the maximum radial tolerance between the seal face on the lip of the bell seal and the interior surface of the nozzle chamber. During operation of the turbine, the seal face of the lip portion of the bell seal device goes from this initial clearance to compressive contact against the interior surface of the nozzle chamber due to the combined effects of the differential thermal expansion of the bell seal device and the radially outward strain imposed by the large pressure gradient taken across the bell seal device. However, depending upon the initial manufactured clearance, or a pressure gradient considerably less than the predetermined value, there may remain a small radial clearance between the seal face of the lip of the bell seal device and the interior surface of the nozzle chamber. Other factors tending to cause a radial clearance to exist between the lip of the bell seal device and the interior of the nozzle chamber have been identified as either a differential creep of the nozzle chamber away from the bell seal device or excessive initial clearance between the bell seal device and the nozzle chamber due to excessive machining at manufacture of the bell seal device. The former factor is accelerated at operation in the higher inlet temperatures at the main inlet conduit. Any combination of these aforementioned causes could be acting simultaneously.

It has been observed that high vibration and noise levels occur in turbine apparatus wherein the seal clearance between the bell seal lip and the interior surface of the nozzle chamber exceeds the predetermined clearance allowed. Examination of these apparatus have indicated seal clearances in some of the damaged apparatus many times in excess of that required. The vibration of the bell seal device due to an initial excessive clearance causes the seal face on the lip of the bell seal device to abraid against the interior of the nozzle chamber thus increasing the clearance between the bell seal device and the nozzle chamber wall. In some apparatus, the noise and vibration during operation of the apparatus resulted in cracks and fissures within the bell seal device or the main inlet conduit itself.

Empirical studies indicate that the vibrations emanate from a steam flow in the narrow clearance channel between the seal face of the bell seal lip and the inner surface of the nozzle chamber. It is well known to those skilled in the art that high steam leakage flow between two concentric cylindrical surfaces with relatively small clearance therebetween induces an unstable state that is prone to initiate flow-excited vibration in the adjacent parts.

It is the flow of steam through the narrow clearance channel between the seal face on the lip of the bell seal device and the nozzle chamber wall which induces the vibration and noise which eventually lead to premature failure of component parts.

Reduction of the initial radial clearance between the seal face on the lip of the bell seal device and the interior surface of the nozzle chamber cannot be considered to solve the problem since the seal face, in order to slide properly during operation of the apparatus, cannot be placed in higher compression against the nozzle chamber. In addition, reduction of the initial radial clearance is impractical due to manufacturing and assembly considerations.

SUMMARY OF THE INVENTION

This invention utilizes at least one split pressure seal ring disposed in a circumferential groove about the radially outward seal face on the lip of the bell seal device. Disposition of the seal ring in the circumferential groove will reduce or eliminate the leakage flow in the narrow channel between the seal face and the nozzle chamber wall.

The seal ring is fabricated of a material having a high elastic property. The seal ring moves radially outward in the circumferential groove on the bell seal device and provides positive sealing against the interior surface of the nozzle chamber due to the combined effects of the seal ring spring action and a pressure differential existing between one surface of the seal ring and another surface. The outer diameter of the seal ring contacts the interior surface of the nozzle chamber and maintains a seal between the seal face of the lip of the bell seal device and the interior surface of the nozzle chamber from the initial clearance through all temperature and pressure transients experienced during operation.

Owing to the spring action of the seal ring, the seal ring follows the nozzle chamber through any differential creep experienced within the nozzle chamber. The sealing action of the seal ring blocks the narrow channel between the seal face on the lip of the bell seal device and the interior surface of the nozzle chamber, thus preventing the steam flow through that channel which causes deleterious noise and vibration effects.

In addition, the seal ring acts as a vibration damper, using friction generated in the interfaces between the seal ring and the bell seal device and between the seal ring and the interior surface of the nozzle chamber to dissipate vibratory energy.

It is an object of this invention to provide a seal ring between the seal face of the bell seal device and the interior surface of the nozzle chamber to interrupt leakage flow between the bell seal device and the nozzle chamber. It is a further object of this invention to provide a seal ring which utilizes frictional forces generated between the seal ring and the bell seal device and between the seal ring and the interior surface of the nozzle chamber to absorb vibratory energy generated within the bell seal device.

BRIEF DESCRIPTION OF THE DRAWINGS

The invention will be more fully understood from the following detailed description of an illustrative embodiment taken in connection with the accompanying drawings, in which.

DESCRIPTION OF THE PREFERRED EMBODIMENT

Figure 2:
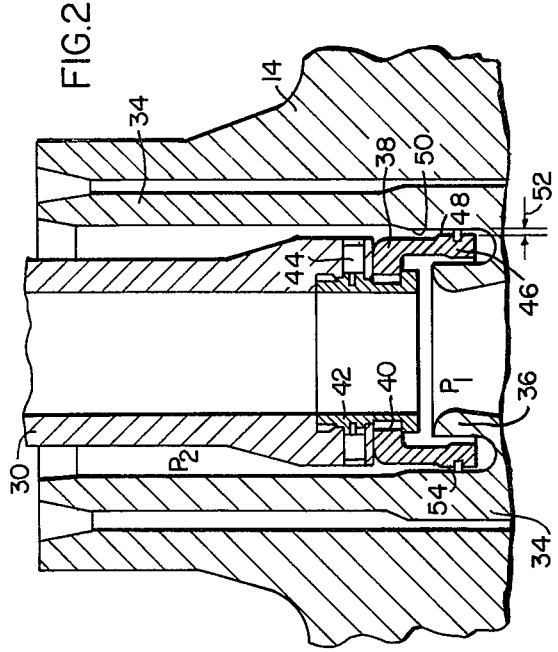
FIG. 2 is an expanded view, in section, of a bell seal device embodying the teachings of the invention; and, FIG. 3 is a sectional view of a bell seal device having a seal ring disposed thereon according to the teachings of this invention.

Throughout the following description, similar reference characters refer to similar elements in all figures of the drawings.

Figure 1:
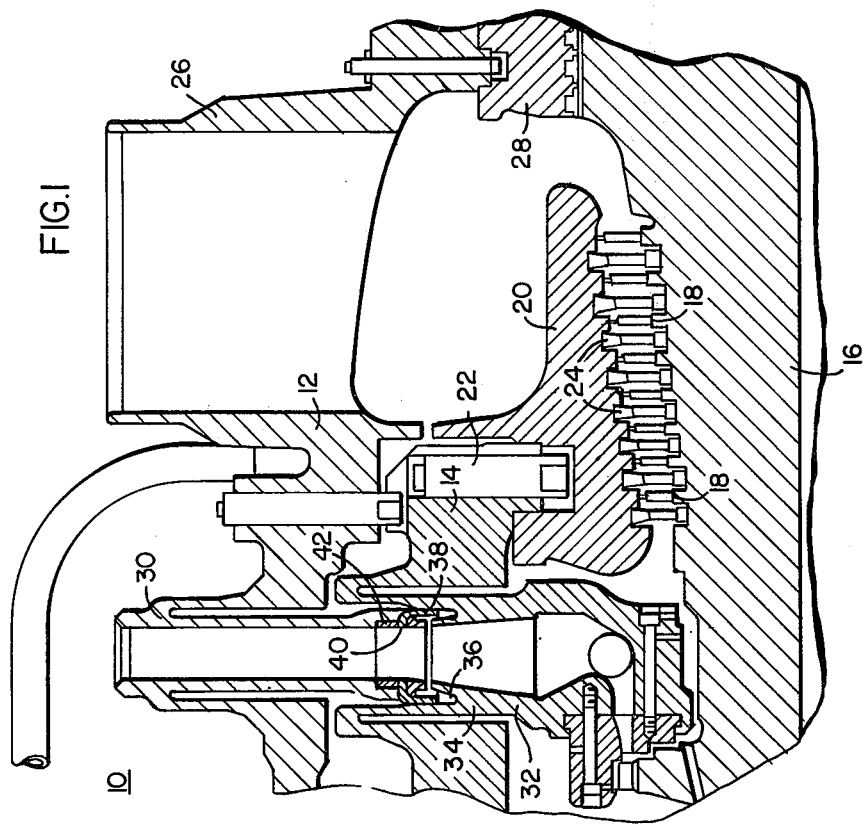
FIG. 1 is a view in longitudinal section of a portion of a high pressure turbine apparatus utilizing a bell seal device embodying the teachings of the invention.

Referring now to FIG. 1, a longitudinal view entirely in section of a portion of a high pressure turbine apparatus 10 utilizing the teachings of this invention is illustrated. The turbine apparatus 10 comprises an outer cylinder 12 concentrically surrounding an inner cylinder 14. The outer cylinder 12 and the inner cylinder 14 surround a rotor 16 having a plurality of rotating blades 18 disposed on the rotor 16. A blade ring 20 is attached to the inner cylinder 14 by suitable means of attachment 22. A plurality of stationary nozzle blades 24 is attached to the blade ring 20. A high pressure exhaust 26 integral with the outer cylinder 12 conducts the motive fluid which has passed through the turbine blading into associated intermediate or lower pressure turbine elements. Suitable seals 28 are provided to prevent the escape of the motive fluid from the interior of outer cylinder 12.

A main steam inlet conduit 30 is integral with the outer cylinder 12 and extends a predetermined distance inward on a vertical line from the surface of the outer cylinder 12 toward the rotating shaft 16. A nozzle chamber 32 integral with the inner cylinder 14 has a vertically outward extending neck portion 34 which overlaps but does not contact the innermost portion of the main inlet conduit 30. A lip member 36 extends circumferentially about the interior of the nozzle chamber neck 34 adjacent the innermost portion of the main inlet conduit 30. The lip 36 has a predetermined radial clearance with the interior surface of a bell seal device 38.

The bell seal device 38 is disposed between the innermost portion of the main inlet conduit 30 and the interior surface of the nozzle chamber neck 34. The bell seal device 38 provides a flexible, movable seal arrangement between adjacent portions of the main inlet conduit 30 integral with the outer cylinder 12 and the nozzle chamber neck 34 integral with the inner cylinder 14.

Referring now to FIG. 2, the bell seal device 38 has an opening 40 disposed in the crown thereof which receives the innermost portion of the main inlet conduit 30. A retainer member 42 is rigidly affixed to the main inlet conduit 30 by suitable means, such as a pin 44. The retainer 42 secures the bell seal device 38 at the crown portion thereof to the innermost portion of the main inlet conduit 30. The bell seal device 38 extends inward and terminates in a lip portion 46 which is disposed between the nozzle chamber lip 36 and the nozzle chamber neck 34. The radially outward surface 48 of the lip portion 46 of the bell seal device 38 is adjacent to the interior surface 50 of the nozzle chamber neck 34.

The bell seal device 38 is fabricated of any material having a higher coefficient of expansion than the coefficient of expansion of the material utilized in the nozzle chamber neck 34. The bell seal device 38 is usually fabricated of a material having excellent high temperature properties resistant to creep and wear. Since the bell seal device 38 has a higher coefficient of thermal expansion than the material in the nozzle chamber neck 34, the bell seal device 38 expands more rapidly due to thermal gradients than does the nozzle chamber neck 34. Upon heating, the initial clearance between the bell seal device 38 and the nozzle chamber neck 34 closes, thus creating a seal. Upon cooling, the clearance reopens. This action prevents the bell seal device 38 from becoming locked against the interior surface of the nozzle chamber neck 34. Thus ease in removal and repair of the bell seal device 38 is provided.

In order to facilitate fabrication of the turbine 10, the bell seal device 38 is installed in the position illustrated in FIG. 2 so that a predetermined, small initial clearance 52 radially exists between the surface 48 on the lip 46 of the bell seal device 38 and the interior surface 50 of the nozzle chamber neck 34. Upon heating of the turbine parts, the seal face 50 of the bell seal device 38 moves from the initial clearance 52 into compressive contact with the surface 50 of the nozzle chamber neck 34. The bell seal device 38 responds to the combined effect of differential thermal expansion and the large pressure build-up on the interior of the bell seal device 38 to move into compressive contact with the surface 50 of the nozzle chamber 34. However, depending upon initial manufactured clearance or an internal pressure less than the predetermined value, the clearance 52 between the seal face 48 and the nozzle chamber surface 50 may not close.

As a consequence, a narrow annular channel 54 is defined by the seal surface 48 on the lip of the bell seal device 38 and the interior surface 50 of the nozzle chamber neck 34. Since there is a large pressure region P1 associated with the inlet pressure of the elastic, motive fluid existing at one side of the narrow channel 54 and a lower pressure region P2 existing at the other side of the narrow channel 54, a steam flow between the different pressure regions P1 and P2 is engendered within the narrow channel 54. The high steam leakage flow between the two concentric cylindrical surfaces 48 and 50 within the relatively small clearance channel 54 creates an unstable condition around the narrow channel 54. Flow excited vibration results from the steam flow in the channel 54. As a result, the seal surface 48 abraids against the surface 50 of the nozzle chamber neck 34, with further widening the clearance 52 between the surfaces 48 and 50 resulting from the abrasion therebetween. If left unchecked, the flow induced vibration results in damage either to the main inlet conduit 30 or the bell seal device 38.

Figure 3:
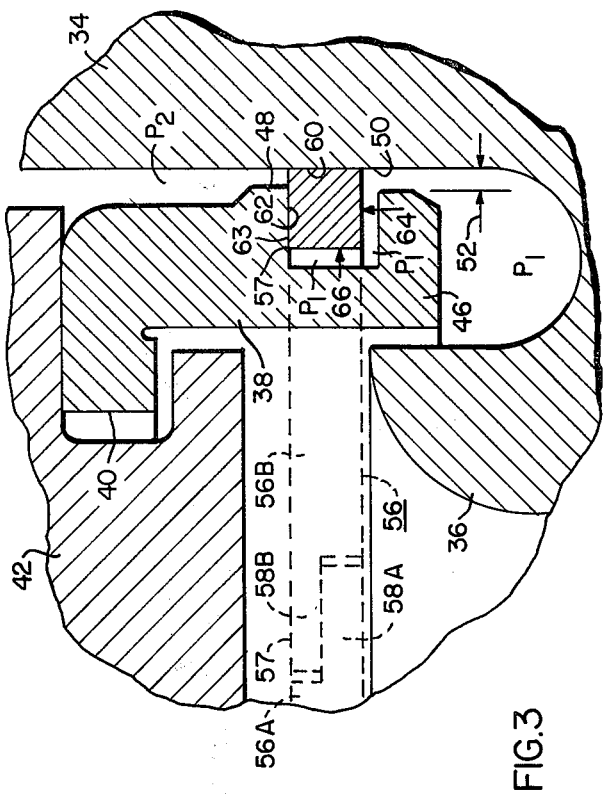

Referring now to FIG. 3, a split ring pressure seal 56 is disposed in a circumferential groove 57 extending about the seal surface 48 on the lip portion 46 of the bell seal device 38. The split seal ring 56 provides positive sealing between the bell seal device 38 and the interior surface 50 of the nozzle chamber neck 34.

The split seal ring 56 is fabricated of a material having resistance to creep and wear at high temperatures and being resistant to erosion and corrosion. In addition, the ring 56 should have excellent properties of elasticity, even at high temperatures. The split ring 56 is a circular member having a split in one predetermined location. The ring 56 is split in such a manner as to have two extending flange portions 58A and 58B respectively thereon. In the view shown in FIG. 3, the pair of flanges 58A and 58B overlap each other within the groove 57, thus reducing leakage flow through the split in the ring 56. Provision of the split ring 56 having high elastic properties permits the split ring 56 to expand within the groove 57 so as to maintain contact between the surface 50 of the nozzle chamber neck 34 and the bell seal device 38. The split ring 56 thus has spring-like characteristics in the radial direction. Thus, the channel 52 between the surfaces 48 and 50 through which the deleterious leakage flow passed has been effectively blocked.

The split 56 establishes a contact interface between the radially outward surface 60 of the split ring 56 and the surface 50 of the nozzle chamber neck 34. In addition, the split ring 56 establishes contact between the top surface 62 of the split ring 56 and the top surface 63 of the groove 57. The top surface 62 of the split ring 56 is held in position against the top surface 63 within the groove 57 by a force exerted by the pressure region P1 below the split ring 56. As is illustrated in FIG. 3, the pressure in region P1 associated with the turbine inlet pressure exerts a force in directions 64 and 66 on the split ring 56. The force of the inlet pressure acting in the direction 64 tends to hold the top surface 62 of the split ring 56 in position against the top surface 63 of the groove 57. The force of the inlet pressure acting in direction 66 in conjunction with the spring action due to the elastic quality of the split seal ring 56, maintains the radially outward surface 60 of the split ring 56 in position against the surface 50 of the nozzle chamber neck 34.

In addition to blocking the narrow channel 54 which led to flow induced vibration, disposition of the split ring 56 within the groove 57 imparts an additional damper effect to absorb vibratory energies engendered within the split ring 56 from other sources. Vibrations engendered in the bell seal device 38 which act in the direction 66 generate a frictional force in the interface between the top surface 62 and the top surface 63 of the groove 57. The frictional force at the interface between the top surface 62 of the seal ring 56 and the top surface 63 of the groove 57 absorbs and dampens the vibratory energies within the bell seal device 38. In addition, vibrations induced within the bell seal device 38 which act in the direction 64 will generate a frictional force at the interface between the radially outward surface 60 of the split ring 56 and the surface 50 of the nozzle chamber neck 34.

It is thus seen that disposition of the elastic split seal ring 56 within the circumferential groove 57 on the seal surface 48 of the bell seal device 38 provides positive seal between the bell seal device 38 and the interior surface 50 of the nozzle chamber neck 34. The narrow channel 54 between the seal face 48 on the bell seal device 38 and interior surface 50 on the nozzle chamber neck 34 is effectively blocked, thus preventing flow induced vibrations due to the leakage flow of steam from the high pressure region P1 to two lower pressure regions P1 which passes through the narrow channel 54. In addition, the interface between the radially outward surface 60 of the split seal ring 56 and the inner surface 50 of the nozzle chamber neck 34 and the interface between the top surface 62 of the split seal ring 56 and the top surface 63 of the groove 57 generate frictional forces which absorb vibratory energies engendered within the bell seal device 38.

Although the drawings and the descriptions of the split seal ring 56 have related to utilization of the split seal ring 56 in a high pressure turbine apparatus, it is to be understood that the teachings of this invention are applicable to any turbine apparatus utilizing a bell seal device 38 to insure sealing between the concentric inner and outer turbine cylinders.

It is thus seen that utilization of the teachings of this invention provides a seal ring to be used with a bell seal device which improves the sealing capabilities of a bell seal device and, in addition, provides a friction damper for absorbing vibrational energies within the bell seal device.

I claim as my invention:

1. An axial flow elastic fluid turbine apparatus comprising:
   an inner cylinder;
   a nozzle chamber integral with said inner cylinder, said nozzle chamber having a surface thereon;
   conduit means for introducing said elastic fluid into said nozzle chamber
   a bell seal device disposed between said conduit means and said surface of said nozzle chamber, said bell seal device having an outer surface thereon, said bell seal device having a groove disposed circumferentially about the outer surface thereof; and, an expandable annular seal ring having an axis extending therethrough disposed within said groove on said bell seal device, said seal ring having a radially inner and a radially outer surface with respect to its axis thereon, said seal ring disposed within said groove so that said radially outer surface thereof abuts against said surface of said nozzle chamber.

2. The turbine of claim 1, further comprising:

an outer cylinder surrounding said inner cylinder, said conduit means being integral with said outer cylinder, and wherein said bell seal device is a substantially bell-shaped member having an axis therethrough and having a crown portion thereon, said crown portion having an opening therein receiving said conduit means, said outer surface of said bell-shaped member extending axially and flaring radially outward with respect to its axis to form a lip portion, said groove being disposed on said lip portion, said groove having a bottom and axially upper and lower sidewalls, said seal ring having thereon axially upper and lower surfaces defined with respect to its axis said seal ring being disposed in said groove so that said radially inner surface thereof is spaced a radial distance away from said bottom of said groove, and so that said axially upper surface of said seal ring abuts against said axially upper sidewall of said groove.

3. The turbine of claim 2 wherein said radially inner surface and said axially lower surface of said seal ring being exposed to said elastic fluid, said elastic fluid exerting a force on said axially lower surface of said seal ring to maintain said axially upper surface of said seal ring in abutting contact with said upper sidewall of said groove, said seal ring disposed so that relative motion between said axially upper surface thereof and said upper sidewall of said groove generates a friction force therebetween tending to dampen said relative motion and to dissipate vibrational energy within said bell seal device.

4. The turbine of claim 3 wherein said annular seal ring is fabricated of a material having an elastic property, said seal ring having a split therein, said split seal ring having a first terminus and a second terminus thereon, said first terminus having a first flange extending therefrom, said second terminus having a second flange extending therefrom, said first flange overlapping said second flange when said seal ring is disposed within said groove, said elastic property of said material tending to urge separation between said first and said second termini.

5. The turbine of claim 4 wherein said elastic fluid exerts a force on said radially inner surface of said seal ring which combines with the elastic property of the material used to fabricate said seal ring to maintain said radially outer surface of said seal ring in abutting contact with said surface of said nozzle chamber, said seal ring being disposed to that relative motion between said radially outer surface of said seal ring and said surface of said nozzle chamber generates a friction force therebetween tending to dampen said relative motion and to dissipate vibrational energy within said bell seal device.

* * * * *